United States Patent [19]

MacMillan

[11] 3,990,822
[45] Nov. 9, 1976

[54] MECHANISM FOR MAINTAINING ALIGNMENT BETWEEN TWO RELATIVELY MOVABLE MEMBERS

[76] Inventor: Kenneth T. MacMillan, 4992 Wesleyan Woods Drive, Macon, Ga. 31204

[22] Filed: Nov. 25, 1975

[21] Appl. No.: 635,075

[52] U.S. Cl. ................................ 425/25; 425/19
[51] Int. Cl.² ........................................ B29H 5/04
[58] Field of Search ................ 425/11, 17, 18, 19, 425/21, 22, 23, 24, 25, 26

[56] References Cited
UNITED STATES PATENTS

| | | | |
|---|---|---|---|
| 2,174,188 | 9/1939 | Heintz | 425/23 X |
| 2,375,784 | 5/1945 | Glynn | 425/23 X |
| 2,638,629 | 5/1953 | Heintz | 425/25 |
| 2,736,060 | 2/1956 | Glynn | 425/25 |
| 2,812,547 | 11/1957 | Duerksen et al. | 425/23 |
| 3,109,197 | 11/1963 | Sunday | 425/25 |
| 3,154,814 | 11/1964 | Fike | 425/25 |

*Primary Examiner*—J. Howard Flint, Jr.
*Attorney, Agent, or Firm*—Diller, Brown, Ramik & Wight

[57] ABSTRACT

This disclosure relates to a mechanism for maintaining alignment between two relatively movable members, specifically platens or supports for retreading molds, although not limited thereto, and includes a pair of generally parallel screws with means for axially shifting one of the screws relative to the other to maintain alignment between the two platens or supports.

16 Claims, 5 Drawing Figures

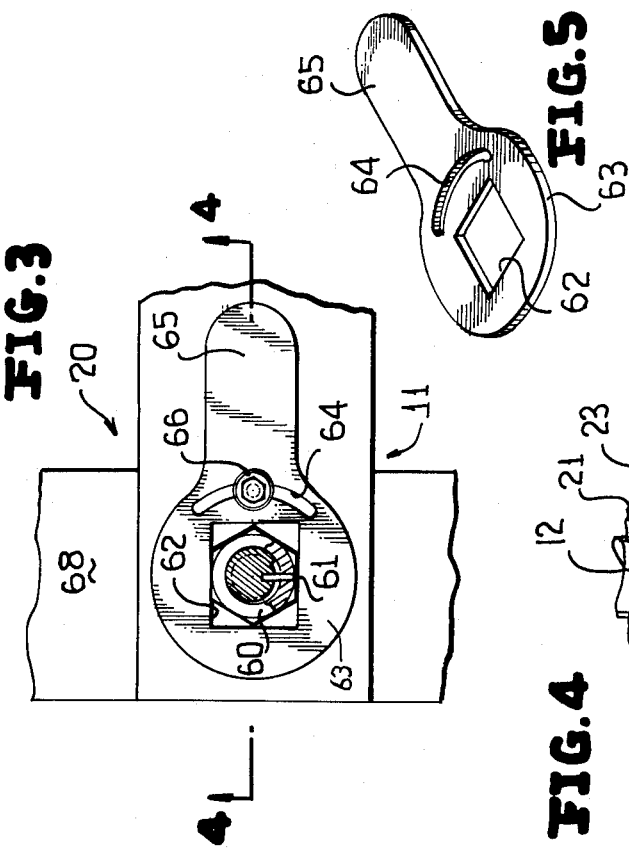
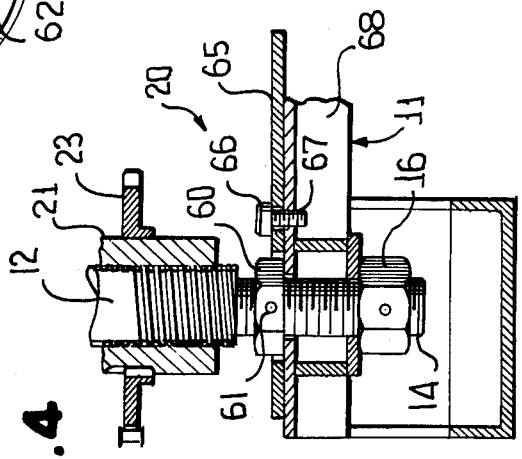
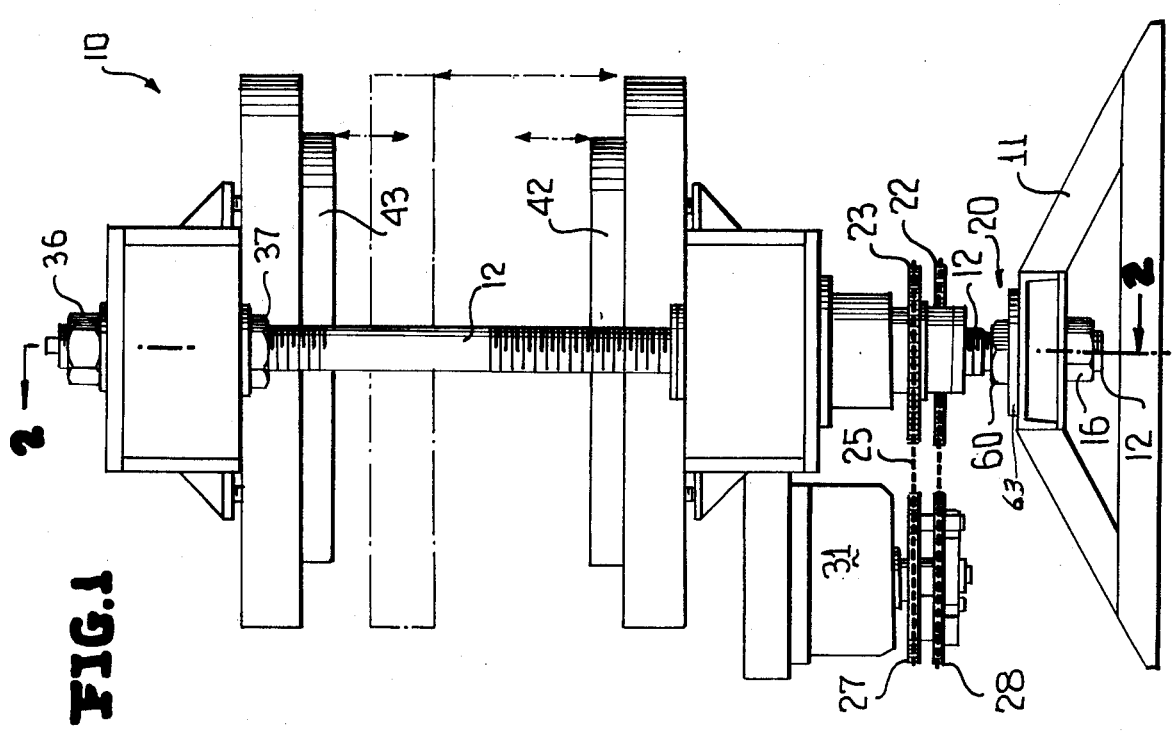

MECHANISM FOR MAINTAINING ALIGNMENT BETWEEN TWO RELATIVELY MOVABLE MEMBERS

The present invention is directed to an apparatus for retreading tires and includes a pair of relatively movable platens or supports carrying matrices in which a tire is retreaded, the platens being moved relative to each other by at least a pair of screws, and means being provided for maintaining alignment between the platens to assure that in the closed position of the matrices there is relative perfect alignment therebetween.

A further object of this invention is to maintain the alignment aforesaid by fixing a nut to one of the screws and providing means for imparting rotation to the nut thereby axially shifting the screw to which the nut is affixed to maintain the desired alignment.

Still another object of this invention is to provide an apparatus of the type heretofore set forth wherein the nut affixed to the screw is rotated by a plate embracing the same with the plate having an arcuate slot through which passes a bolt for maintaining a desired position of relative rotation between the plate and a fixed support.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a side elevational view of an apparatus for retreading tires, and illustrates one of a pair of screws for relatively moving a pair of platens carrying matrices defining in the closed position thereof a mold chamber in which a tire can be retreaded.

FIG. 3 is an enlarged fragmentary sectional view taken generally along line 3—3 of FIG. 2, and illustrates the manner in which a nut is fixed to one of the screws for axially shifting the same.

FIG. 4 is a sectional view taken generally along line 4—4 of FIG. 3, and illustrates in more detail the manner in which the nut is rotated to shift the associated screw relative to the remaining screw.

FIG. 5 is a perspective view of a plate, and illustrates an aperture for embracing the nut and an arcuate slot permitting relative rotation of the plate and securement thereof to a stationary support.

Figure 2:
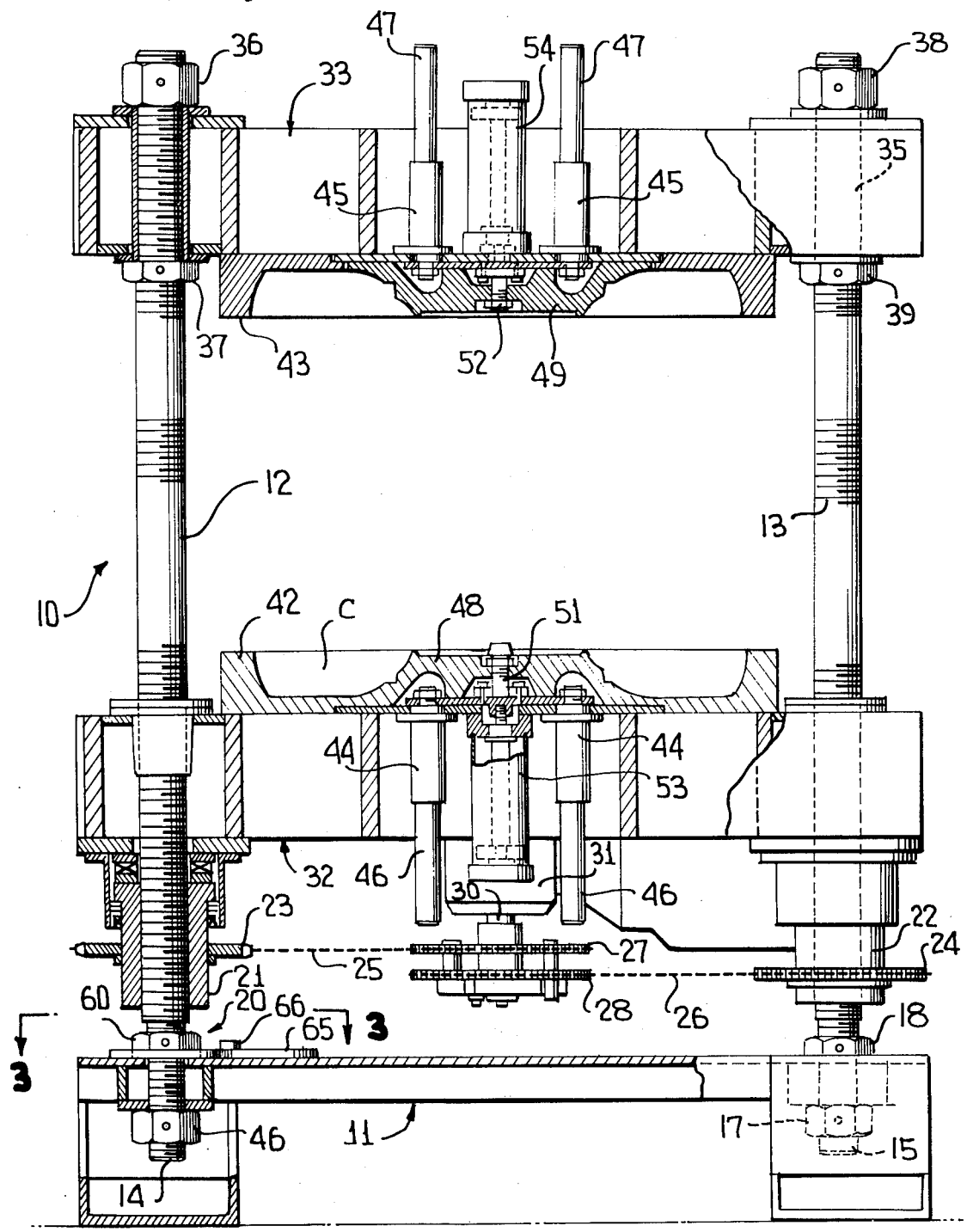
FIG. 2 is a fragmentary enlarged cross-sectional view taken generally along line 2—2 of FIG. 1, and illustrates a pair of screws for imparting relative motion between a pair of platens carrying matrices, and means for axially shifting one of the screws relative to the other.

A novel machine, apparatus or mechanism constructed in accordance with this invention is illustrated in FIGS. 1 and 2 of the drawings, and is generally designed by the reference numeral 10. The apparatus 10 includes a base 11 forming a support for a pair of screws 12, 13. The screws 12, 13 are disposed generally vertically and in parallel relationship to each other. A lower threaded end portion 14, 15 of the respective screws 12, 13 passes through apertures (unnumbered) in the base 11 and have threaded thereupon respective nuts 16, 17. A nut 18 cooperates with the nut 17 to fasten the screw 13 to the base 11 and means, generally designated by the reference numeral 20 also fastens the screw 12 securely to the base 11 but in keeping with this invention also performs the function of permitting axial shifting motion of the screw 12 relative to the screw 13 for alignment purposes in a manner to be described more fully hereinafter.

Nuts 21, 22 having fixed thereto respective sprockets 23, 24 are threaded upon the screws 12, 13, respectively and chains 25, 26 are entrained about the sprocket 23 and another sprocket 27, and about the sprocket 24 and another sprocket 28, respectively, with the sprockets 27, 28 being keyed to a common shaft 30 driven by a motor 31. The motor 31 is reversible in order that rotation may be imparted in opposite directions to the nuts 21, 22 for the purpose of relatively moving a platen or support 32 relative to another platen or support 33 fixed to threaded upper end portions 34, 35 of the respective screws 12, 13 by nuts 36, 37 and 38, 39, respectively, in the manner clearly illustrated in FIG. 2.

The supports or platens 32, 33 carry matrix segments or molds 42, 43, respectively, which in the closed position thereof define an annular chamber C within which a tire (not shown) may be retreaded in a conventional manner as, for example, in the manner fully disclosed in Applicant's commonly assigned Application entitled AUTOMATIC PRODUCTION MOLDS, Ser. No. 391,816 filed Aug. 27, 1973. The platens 32, 33 include guide sleeves 44, 45, respectively, which telescopically receive guide rods 46, 47, respectively, fixed to respective bead aligner wheels 48, 49 which are moved relative to each other by piston rods 51, 52, respectively, secured thereto and reciprocal in fluid or hydraulic cylinders 53, 54. The latter-noted application clearly discloses the manner in which the bead aligner wheels 48, 59 operate relative to a tire (not shown) which is to be retreaded within the cavity C of the closed matrices 42, 43.

Thus, upon rotation of the sprockets 27, 28 the nuts 21, 22 rotate and act through bearings (unnumbered) to lift or lower the platen 32 relative to the platen 33 for opening and closing the matrices 42, 43.

Reference is now made specifically to FIGS. 3-5 of the drawings in which the means 20 is more specifically illustrated and includes a nut 60 fixed by a pin 61 to the lower threaded end portion 14 of the screw 12. The nut 60 is embraced or surrounded by an aperture 62 of a plate 63 which also includes an arcuate slot 64 and a handle 65. The dimension of the opening or aperture 62 is such as to act as a wrench for the nut 60, as is most readily apparent in FIG. 3. A bolt 66 passes through the arcuate slot 64 and is threaded into a threaded bore 67 of a cross piece 68 of the frame 11. When the bolt 66 is loosened the handle 65 of the plate 63 can be rotated clockwise or counterclockwise and motion is imparted to the nut 60 which since keyed to the screw 12 will raise or lower the nut 21 relative to the nut 22 which in turn will raise or lower the left-hand end of the platen 32 relative to the right-hand end (as viewed in FIG. 2). Thus, should there be any misalignment between the matrix segments 42, 43, particularly in the closed position thereof, such misalignment can be corrected by simply rotating the nut 60 by motion imparted to the plate 63 with the same then being locked at a desired angular position of adjustment by tightening the bolt 66. Once thus adjusted the platen 32 will move accurately into alignment with the platen 33 when the matrices 42, 43 are closed, and should one or the other of the screws 12, 13 wear or cause misalignment then readjustment of the platen 32 can again be made by simply rotating the nut 60 to raise or lower the nut 21 as the screw 12 rotates to thus raise or lower the platen 32.

While preferred forms and arrangement of parts have been shown in illustrating the invention, it is to be clearly understood that various changes in details and arrangement of parts may be made without departing from the scope and spirit of this disclosure.

I claim:

1. A mechanism for maintaining alignment between two relatively movable members comprising a pair of relatively movable members, a pair of screw means for moving said members relative to each other, and means for axially shifting said pair of screw means relative to each other whereby misalignment between said members can be readily compensated.

2. The mechanism as defined in claim 1 wherein said pair of screw means are in generally parallel relationship to each other.

3. The mechanism as defined in claim 1 wherein said relatively movable members carry cooperative means for defining a mold which is closed when said relatively movable members are adjacent each other.

4. The mechanism as defined in claim 1 including means rotatably carried by said pair of screw means for moving said movable members relative to each other.

5. The mechanism as defined in claim 1 including means rotatably carried by said pair of screw means and movable in unison therealong for moving said movable members relative to each other.

6. The mechanism as defined in claim 1 wherein said axially shifting means is a nut carried by one of said pair of screw means.

7. The mechanism as defined in claim 1 wherein said axially shifting means is a nut fixedly carried by one of said pair of screw means.

8. The mechanism as defined in claim 1 including a stationary support, and said axially shifting means axially shifts at least one of said pair of screw means relative to said stationary support.

9. The mechanism as defined in claim 8 wherein said pair of screw means are in generally parallel relationship to each other.

10. The mechanism as defined in claim 9 wherein said axially shifting means is a nut carried by one of said pair of screw means.

11. The mechanism as defined in claim 10 including means for securing said nut to said stationary support.

12. The mechanism as defined in claim 10 including means for adjustably securing said nut to said stationary support.

13. The mechanism as defined in claim 11 wherein said securing means is a plate member secured to said nut, and means for angularly adjustably securing said plate to said stationary support.

14. The mechanism as defined in claim 12 wherein said securing means is a plate member secured to said nut, and means for angularly adjustably securing said plate to said stationary support.

15. The mechanism as defined in claim 13 wherein said securing means is an aperture in said plate defined by an edge embracing said nut.

16. The mechanism as defined in claim 14 wherein said securing means is an aperture in said plate defined by an edge embracing said nut.

* * * * *